United States Patent [19]
McCarty et al.

[11] 4,112,154
[45] Sep. 5, 1978

[54] METHOD FOR OBTAINING UNIFORM POROSITY IN PRINTED INHERENTLY POROUS CIGARETTE TIPPING PAPERS

[75] Inventors: Stuart Wayne McCarty, Brevard; Clarence Morris O'Shields, Hendersonville, both of N.C.

[73] Assignee: Olin Corporation, Pisgah Forest, N.C.

[21] Appl. No.: 830,183

[22] Filed: Sep. 2, 1977

[51] Int. Cl.[2] .......................... B32B 7/14; B44D 5/00; B44D 5/12

[52] U.S. Cl. .......................... 427/401; 131/10 A; 131/15 B; 156/291; 427/285; 427/288; 427/395

[58] Field of Search ............... 427/288, 401, 395, 285; 131/10 A, 15 B; 156/291

[56] References Cited

U.S. PATENT DOCUMENTS

| | | | |
|---|---|---|---|
| 2,980,116 | 4/1961 | Schur | 131/10 A |
| 2,988,088 | 6/1961 | Schur | 131/10 A |
| 3,085,898 | 4/1963 | Vaurio | 427/288 X |
| 3,288,628 | 11/1966 | Schur et al. | 427/288 X |
| 3,410,274 | 11/1968 | Davis | 131/10 A |
| 3,410,275 | 11/1968 | Tucker | 131/10 A |
| 3,441,427 | 4/1969 | Skrotronick | 427/288 X |
| 3,632,384 | 1/1972 | Pastow | 427/288 X |
| 3,805,800 | 4/1974 | Summers | 131/10 A |
| 3,924,643 | 12/1975 | Summers | 131/10 A |
| 4,035,220 | 7/1977 | Hammersmith | 156/291 |

*Primary Examiner*—Michael R. Lusignan
*Attorney, Agent, or Firm*—Robert W. Habel

[57] ABSTRACT

A method for obtaining uniform porosity in printed inherently porous cigarette tipping papers from base papers of differing relative porosities, comprising measuring the porosity of the base paper and adjusting the viscosity of the ink used to print the base paper relative to the porosity of the base paper. The viscosity of the ink is progressively increased or decreased relative to decreases or increases respectively in the porosity of the base paper to arrive at a predetermined uniform final porosity in the printed paper.

6 Claims, No Drawings

METHOD FOR OBTAINING UNIFORM POROSITY IN PRINTED INHERENTLY POROUS CIGARETTE TIPPING PAPERS

FIELD OF THE INVENTION

This invention relates generally to ventilated filter tip cigarettes and more particularly to ventilated filter tip cigarettes utilizing inherently porous tipping paper in their construction.

BACKGROUND OF THE INVENTION

Ventilated filter tip cigarettes are well known and have been utilized for a number of years as a means for allowing air to be drawn into the cigarette during puffing which bypasses the burning zone and mixes with the smoke, thereby resulting in a cooler, less harsh-tasting cigarette. While a variety of ventilation techniques have been employed over the years, the most common practice has been to perforate the cigarette tipping paper with relatively small holes in a circumferential band or pattern around the cigarette mouthpiece, thereby providing openings for air to mix with the smoke as it is drawn through the cigarette. Such tipping paper is usually mechanically perforated and is used as an envelope over a uniformly porous plug wrap which encloses the filter plug whereby the air passes through the holes and the porous plug wrap into the filter media and mixes with the smoke from the cigarette. Typical cigarettes of this construction are disclosed in U.S. Pat. No. 2,988,088.

In recent years, more sophisticated ventilation techniques have been developed in which the filter plug is wrapped with a uniformly porous plug wrap and overwrapped with a uniformly porous tipping envelope. The tipping envelope and plug wrap are adhered together by an adhesive along preselected portions of their contiguous surfaces with the remaining portions left adhesive-free to allow air to pass through such areas and into the filter media to blend with the smoke. Such adhesive-free areas are generally referred to as ventilation regions. Cigarettes of this type of construction are disclosed in U.S. Pat. Nos. 3,805,800, 3,924,643 and 4,035,220.

One of the problems associated with cigarettes utilizing such porous tipping papers is variation in porosity or air permeability of the tipping paper causing large variations in pressure drop in cigarettes made therefrom resulting in inconsistent tar and nicotine yields from one cigarette to another in the same batch. The primary reason for the variation is the lack of uniformity in porosity of the inherently porous tipping papers. Such tipping papers are made on the paper machine with a relatively open structure so that air can readily pass through the paper. Due to the very nature of the paper manufacturing operation, it is very difficult to produce a consistent product having the same porosity on the machine during a run and especially from one run to the next.

Porosity control is very important with inherently porous tipping paper since the porosity of the product determines, to a large extent, the amount of air dilution obtained in cigarettes in which the paper is employed. Since such papers must be totally or partially printed for appearance purposes, this also has a pronounced effect upon porosity variation. Inherently porous tipping is overprinted with a solid or patterned design in order to impart increased light opacity to the porous sheet and give it standard tipping appearance, such as in the case of white tipping or cork tipping. Normally, the paper is printed using conventional rotogravure printing techniques to achieve good appearance in the finished printed product. If the rotogravure printing operation is performed in the normal manner by adjusting ink viscosity to give good appearance, the porosity of the printed tipping paper varies directly in accordance with variations in the porosity of the base paper. Moreover, it has been found that variations in porosity of the printed product are even greater than the variations in porosity in the base paper when conventional printing techniques are used. Therefore, it is an object of this invention to provide a method for producing printed inherently porous cigarette tipping papers in which the porosity of the printed product is controlled to obtain uniform porosity.

SUMMARY OF THE INVENTION

Surprisingly, we have discovered that the viscosity of the ink used in printing inherently porous cigarette tipping paper is critically important in relation to the porosity of the unprinted base paper in order to obtain a uniform final porosity in the printed sheet. Changes in the initial base paper porosity are inversely related to printing ink viscosity such that the final porosity of the printed product can be controlled by varying the ink viscosity during printing. Thus, in accordance with this invention, a method has been devised for obtaining uniform porosity in printed inherently porous cigarette tipping papers from base papers of differing relative porosities, comprising measuring the porosity of the base paper and adjusting the viscosity of the ink used to print the base paper relative to the porosity of the base paper by progressively increasing or decreasing the viscosity of the ink relative to decreases or increases respectively in the porosity of the base paper to arrive at a predetermined uniform final porosity in the printed paper. By measuring the porosity of the base paper prior to printing and making appropriate adjustments of the ink viscosity, porosity of inherently porous tipping papers can be substantially controlled to achieve uniform porosity in the printed product.

Porosity of the tipping paper is determined using standard Filtrona air permeability measurement techniques in accordance with the following equation:

$$\text{Filtrona Air Permeability} = \text{cc/min/cm}^2\text{/10 cm water gauge.}$$

Thus, Filtrona air permeability can be defined as the cubic centimeters of air that will pass through a 1-square-centimeter sheet of paper in 1 minute at 10 centimeters water gauge pressure differential. Ink viscosity is measured using the conventional Zahn Cup technique in which the time is measured for a given amount of ink to pass through a standard opening in the cup.

As will be described in more detail below, variations in porosity of inherently porous cigarette tipping paper can be dramatically controlled by employing the method of this invention thereby achieving a desired predetermined final uniform porosity in the printed paper. While the invention will primarily be described in relation to printing of inherently porous tipping papers with inks, it is also amenable to printing or coating of such papers with other materials, such as various coating suspensions, or sizes of similar viscosities, and materials such as the cellulose ethers; for example, carboxymethylcellulose, and methyl or ethyl cellulose, to achieve the same desired uniform porosity in the finished product.

DESCRIPTION OF PREFERRED EMBODIMENTS

The inherently porous tipping papers used in accordance with the following described process are manufactured using conventional paper-making techniques on a Fourdrinier machine employing a slurry of cellulosic fibers such that the resulting paper product is very open and highly porous, permitting air to pass through the paper as produced from the machine. Thus, by inherently porous what is meant is paper that is made with a certain degree of porosity in the papermaking process, per se, and not one that is made that way by subsequent treatment, such as by perforating. Inherently porous tipping papers suitable for ventilated cigarettes may have porosities within a wide range Filtrona air permeability units as defined in accordance with the above formula. Of course, the higher the Filtrona number, the greater the air permeability of the paper. After production of the paper, it is slit into master rolls prior to printing and the porosity of each roll measured to determine the Filtrona air permeability of that sample. In accordance with the invention, it was found that highly porous papers require less viscous inks in order to achieve a predetermined printed tipping paper porosity, whereas less porous papers require a higher viscosity ink to achieve the same predetermined printed inherently porous tipping porosity. One explanation for this effect is that more viscous inks stay on or near the surface of the sheet and do not flow out to fill up the pores of the paper structure, whereas less viscous inks will flow more readily into the base sheet, thus partially filing the porous structure and altering the porosity characteristics to a greater extent. Therefore, in accordance with our discovery, if a less viscous ink is used on a highly porous sheet, it will have a greater effect on the ultimate porosity of the printed product than would a more viscous ink on the same product. For example, thin ink of 8.2 seconds to 8.8 seconds Zahn tends to flow into the sheet and stop it up with the porosity numbers of the coated product being lower, while thicker ink of 9.2 seconds to 10.0 seconds Zahn does not flow well and tends to leave the sheet open with the resulting porosity number of the coated sheet being higher. Thus, the method of this invention comprises obtaining a uniform porosity in printed inherently porous cigarette tipping papers from base papers of differing relative porosities by adjusting the viscosity of the ink used to print the base paper relative to the initial porosity of the base paper by progressively increasing or decreasing the viscosity of the ink in relation to decreases or increases in the porosity of the paper, respectively, in order to obtain a predetermined uniform final porosity in the printed product.

EXAMPLE

Typical inherently porous tipping base paper illustrating a normal variation in inherent porosity was selected for printing with white ink to improve opacity and appearance. Samples demonstrating base paper porosity levels varying from 850 to 1600 Filtrona air permeability units were chosen for printing. The entire surface on one side of each porosity selected sample was coated with a commercial grade white ink sold by Thigle-Engdahl, Inc. and identified as SWC 3508 using conventional rotogravure printing techniques. The ink viscosity used for printing each sample was identical. After printing, the porosity of each sample was measured and the results were as follows:

TABLE I

| Base Paper Porosity | Ink Viscosity (sec. - No. 3 Zahn Cup) | Printed Tipping Porosity |
|---|---|---|
| 850 | 10 | 650 |
| 900 | 10 | 800 |
| 950 | 10 | 900 |
| 1050 | 10 | 1000 |
| 1200 | 10 | 1100 |
| 1400 | 10 | 1200 |
| 1600 | 10 | 1400 |

As is evident from the foregoing table, when the ink viscosity is held contant, a uniform final porosity in the printed product cannot be obtained from a base paper because of run-to-run or within-run porosity variation.

In accordance with the invention, the same series of base paper samples were printed with the same white ink except the viscosity of the ink was progressively reduced respectively relative to each samples's increase in porosity. A standard solvent for the ink of normal propyl acetate was used to reduce its viscosity for each printing. The results obtained in this instance were as follows:

TABLE II

| Base Paper Porosity | Ink Viscosity (sec. - No. 3 Zahn Cup) | Printed Tipping Porosity |
|---|---|---|
| 850 | 10.5 | 750 |
| 900 | 9.7 | 850 |
| 950 | 9.5 | 850 |
| 1050 | 9.2 | 850 |
| 1200 | 9.0 | 850 |
| 1400 | 8.7 | 800 |
| 1600 | 8.5 | 850 |

The final printed porosity of each of the samples in the above series is relatively constant and uniform compared to the initial differing base paper porosities. Thus, it will be apparent that the method of this invention provides a means for controlling the porosity of the final printed product within a relatively close range. Only in this manner are printed inherently porous tipping papers made suitable for use in ventilated cigarettes since with porosity control and uniformity, air dilution will be constant, resulting in consistent tar and nicotine yields from cigarettes constructed with such tipping papers.

From the foregoing it will be apparent that this invention provides a unique method for obtaining uniformly porous printed cigarette tipping papers. Although the invention has been described in conjunction with the preferred embodiments, the examples and description are only illustrative thereof and many variations and modifications will be apparent to those skilled in the art. Therefore, it is intended that the invention only be limited to the extent set forth in the following claims.

What is claimed is:

1. A method for obtaining uniform porosity in inherently porous cigarette tipping papers from base papers of differing relative porosities, comprising measuring the porosity of the base paper, coating the base paper with a liquid solution whose viscosity is adjusted according to the porosity of the base paper, said liquid solution selected from the group consisting of printing inks, coating suspensions, paper sizes, cellulose ethers and carboxymethylcellulose, said viscosity adjusted relatively higher for low porosity paper and relatively lower for high porosity paper, whereby the porosity is controlled to achieve a predetermined final uniform porosity in the area in which the coating is applied to the tipping paper.

2. The method of claim 1 in which the liquid solution is printing ink.

3. The method of claim 1 in which the liquid solution is applied evenly over the entire surface of the paper.

4. The method of claim 1 in which the liquid solution is applied evenly over random areas on one surface of the paper.

5. The method of claim 1 in which the porosity of the base paper is within the range of from 700 to 1800 Filtrona air permeability units.

6. The method of claim 1 in which the viscosity of the liquid solution is within the range of from 8 to 11 seconds Zahn.

* * * * *